United States Patent
Dwarakanath et al.

(10) Patent No.: US 11,653,111 B2
(45) Date of Patent: May 16, 2023

(54) EXPOSURE TRUNCATION FOR IMAGE SENSORS

(71) Applicant: Apple Inc., Cupertino, CA (US)

(72) Inventors: Ashwini Dwarakanath, Cupertino, CA (US); Michael R. Malone, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/483,513

(22) Filed: Sep. 23, 2021

(65) Prior Publication Data

US 2022/0321808 A1   Oct. 6, 2022

Related U.S. Application Data

(60) Provisional application No. 63/169,124, filed on Mar. 31, 2021.

(51) Int. Cl.
*H04N 25/531* (2023.01)
*H04N 25/40* (2023.01)

(52) U.S. Cl.
CPC .......... *H04N 25/531* (2023.01); *H04N 25/40* (2023.01)

(58) Field of Classification Search
CPC .... H04N 5/3532; H04N 5/341; H04N 25/531; H04N 25/40; H04N 25/53; H04N 23/741; H04N 23/73
See application file for complete search history.

(56) References Cited

U.S. PATENT DOCUMENTS

| | | |
|---|---|---|
| 8,098,287 B2 | 1/2012 | Misawa et al. |
| 11,252,337 B1* | 2/2022 | Yang ................. H04N 5/23241 |
| 2012/0154593 A1 | 6/2012 | Anderson |
| 2016/0295097 A1 | 10/2016 | Shanmugavadivelu et al. |
| 2017/0150076 A1* | 5/2017 | Hizi ..................... H04N 5/3532 |

OTHER PUBLICATIONS

Greiffenhagen et al., "Statistical Modeling and Performance Characterization of a Real-Time Dual Camera Surveillance System,".
Xie et al., "Design and Implementation of a Dual-Camera Wireless Sensor Network for Object Retrieval,".
U.S. Appl. No. 17/479,426, filed Sep. 20, 2021, Dhanda.
U.S. Appl. No. 17/479,584, filed Sep. 20, 2021, Dhanda.

* cited by examiner

*Primary Examiner* — Michael E Teitelbaum
(74) *Attorney, Agent, or Firm* — Brownstein Hyatt Farber Schreck, LLP

(57) ABSTRACT

A method of operating an image sensor includes determining a duration of an integration time for an image frame; operating an array of pixels to capture the image frame; receiving a decision to truncate the image frame; truncating the image frame before satisfying the duration of the integration time; and reading out a set of pixel values for the array of pixels. Each pixel in the array of pixels is exposed for a truncated integration time. The truncated integration time has a truncated duration shorter than the determined duration.

18 Claims, 12 Drawing Sheets

EXPOSURE TRUNCATION FOR IMAGE SENSORS

CROSS-REFERENCE TO RELATED APPLICATION

This application is a nonprovisional of and claims the benefit under 35 U.S.C. 119(e) of U.S. Provisional Patent Application No. 63/169,124, filed Mar. 31, 2021, the contents of which are incorporated herein by reference as if fully disclosed herein.

FIELD

The described embodiments generally relate to image sensors and, more particularly, to controlling the exposure or integration time for one or more image frames of an image sensor.

BACKGROUND

Many of today's devices include an image sensor. Image sensors (or cameras) may be used to acquire photographs, videos, navigation or tracking images, and so on. The types of devices that may include an image sensor include mobile phones, computers, wearable devices, vehicle navigation systems, robots, satellites, home appliances, and so on.

An image sensor typically includes an array of pixels. When an image sensor is used to capture an image frame (i.e., a set of pixel values for the array of pixels), the pixels may be exposed to electromagnetic radiation for a discrete period of time, known as an integration time. All of the pixels may be exposed to electromagnetic radiation (e.g., visible and/or non-visible electromagnetic radiation) at the same time, or different pixels may be exposed to electromagnetic radiation at different times (e.g., integration times for different lines of pixels may be started at different times, in what is known as a rolling shutter mode of operation). Although some image sensors may have a physical shutter, the pixels of most image sensors are associated with respective electronic shutters. An electronic shutter clears the charge that has been integrated by a pixel's photodetector just before an integration time is to begin, and reads the integrated charge out to a storage node at the end of the integration period.

Image sensors may be used to acquire image frames under different lighting conditions. When a device can sense an ambient lighting condition and/or receive user input indicating an ambient lighting condition, the image sensor may adjust its integration time for the ambient light condition. In other cases, a user may provide user input that indicates a particular integration time is desired—either to improve image quality, or to achieve an imaging effect. A device may also acquire a series of image frames under different integration times so that the device, or a user, may select a desired image and/or piece together a composite image from multiple image frames. Typical integration times may be on the order of 0.1-20 microseconds ($\mu s$). Longer integration times may be used for lower ambient lighting conditions, and may be on the order of one second or more.

SUMMARY

Embodiments of the systems, devices, methods, and apparatus described in the present disclosure provide exposure truncation for an image sensor. Exposure truncation truncates the duration of a default or programmed integration time for one or more image frames (i.e., exposure truncation shortens the integration time for an image frame). Exposure truncation may be useful, for example, if an image sensor is programmed to capture an image frame in accord with an integration time having a duration greater than a minimum duration (e.g., under a low light condition, while a device including the image sensor is mounted on a tripod or sitting on a stable surface) but, just before or after the integration time begins, the low light condition ceases to exist or the device is picked up and experiences too great of motion to successfully capture an image frame having a longer integration time.

A decision to truncate an image frame may be made at different times, and may affect an image frame in different ways depending on when the decision to truncate is made. If the decision to truncate is made early enough, an image frame may be skipped or the duration of its integration time may be reduced to a minimum duration. If the decision to truncate is made before the integration time for an image frame begins, but too close to the beginning of the integration time, the image frame may be captured using an integration time of minimum duration. If the decision to truncate is not received until after an image frame's integration time begins, the image frame's integration time may be truncated as soon as possible, or at an appropriate or predetermined time. For example, if a decision to truncate is made 100 $\mu s$ into a one second integration time, the integration time may in some cases be truncated to 100, 101, or 110 $\mu s$, depending on an image sensor's configuration. When an integration time for an image frame is truncated, all of an image sensor's pixels may be exposed to electromagnetic radiation for the duration of a truncated integration time, and a set of pixel values may be read out for the truncated image frame. In this manner, image data may be obtained for both non-truncated and truncated image frames.

In a first aspect, an image sensor is described. The image sensor may include an array of pixels, a set of one or more programming registers, and a controller. The set of one or more programming registers may be configured to store a first value indicating a duration of an integration time, and a second value indicating an exposure truncate decision. The controller may be in read communication with the set of one or more programming registers, and may be configured to monitor the second value and operate the array of pixels to capture an image frame in accord with the first value and the second value.

In a second aspect, an electronic device is described. The electronic device may include an image sensor and an image sensor host. The image sensor may include an array of pixels, and a controller configured to monitor for a decision to truncate; determine a duration of an integration time; and capture an image frame by operating the array of pixels in accord with the determined duration of the integration time. The image sensor host may be in communication with the controller, and may be configured to provide the decision to truncate. The controller, upon receiving the decision to truncate, may truncate the duration of the integration time for at least one of the image frame or a subsequent image frame.

In a third aspect, a method of operating an image sensor is described. The method may include determining a duration of an integration time for an image frame; operating an array of pixels to capture the image frame; receiving a decision to truncate the image frame; truncating the image frame before satisfying the duration of the integration time; and reading out a set of pixel values for the array of pixels. Each pixel in the array of pixels may be exposed for a truncated integration time. The truncated integration time may have a truncated duration shorter than the determined duration.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
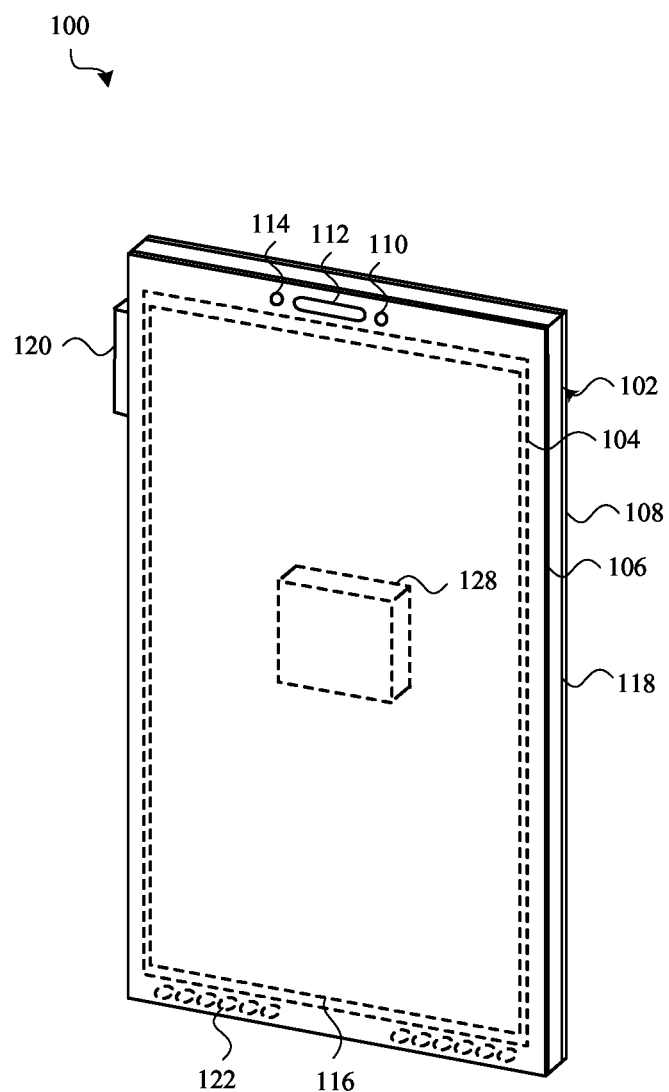
FIGS. 1A and 1B show an example electronic device that may include an image sensor.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Some mobile phones support a night mode or tripod mode in which the integration time for an image frame may be lengthened—sometimes to one second, ten seconds, or more. However, if natural or artificial light brightens the scene that is being imaged, or if the mobile phone is removed from a tripod or other stable surface (e.g., if the mobile phone is picked up by its user), or if the mobile phone's user believes a photographic moment has been missed, it may be desirable to shorten, or truncate, an otherwise lengthy integration time. There may also be instances in which it is desirable to truncate an integration time of more modest duration.

Although it might be possible to implement exposure truncation in software, a software solution may be too slow to achieve a desired truncation. Hardware-based solutions are therefore described in the present description. In most of the described solutions, a set of pixel values are read out for an image frame after truncation. This avoids the need to flush some or all of an image sensor's data pipe, reset the data pipe, reset a software stack, and restart an image sensor.

These and other systems, devices, methods, and apparatus are described with reference to FIGS. 1A-7. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration and is not always limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Figure 1B:
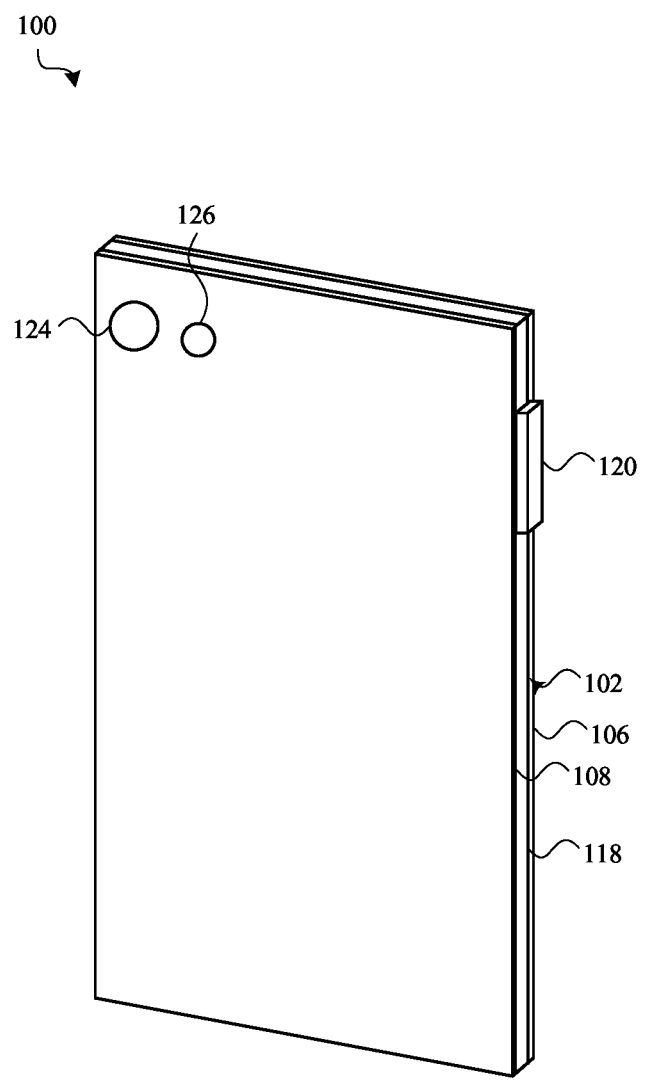

FIGS. 1A and 1B show an example of a device 100 (an electronic device) that may include any of the image sensors described herein. The device's dimensions and form factor, including the ratio of the length of its long sides to the length of its short sides, suggest that the device 100 is a mobile phone (e.g., a smartphone). However, the device's dimensions and form factor are arbitrarily chosen, and the device 100 could alternatively be any portable electronic device including, for example a mobile phone, tablet computer, portable computer, portable music player, portable terminal, vehicle navigation system, robot navigation system, or other portable or mobile device. The device 100 could also be a device that is semi-permanently located (or installed) at a single location (e.g., a door lock, thermostat, refrigerator, or other appliance). FIG. 1A shows a front isometric view of the device 100, and FIG. 1B shows a rear isometric view of the device 100. The device 100 may include a housing 102 that at least partially surrounds a display 104. The housing 102 may include or support a front cover 106 or a rear cover 108. The front cover 106 may be positioned over the display 104, and may provide a window through which the display 104 (including images displayed thereon) may be viewed by a user. In some embodiments, the display 104 may be attached to (or abut) the housing 102 and/or the front cover 106.

The display 104 may include one or more light-emitting elements or pixels, and in some cases may be an LED display, an OLED display, an LCD, an EL display, a laser projector, or another type of electronic display. In some embodiments, the display 104 may include, or be associated with, one or more touch and/or force sensors that are configured to detect a touch and/or a force applied to a surface of the front cover 106.

The various components of the housing 102 may be formed from the same or different materials. For example, a sidewall 118 of the housing 102 may be formed using one or more metals (e.g., stainless steel), polymers (e.g., plastics), ceramics, or composites (e.g., carbon fiber). In some cases, the sidewall 118 may be a multi-segment sidewall including a set of antennas. The antennas may form structural components of the sidewall 118. The antennas may be structurally coupled (to one another or to other components) and electrically isolated (from each other or from other components) by one or more non-conductive segments of the sidewall 118. The front cover 106 may be formed, for example, using one or more of glass, a crystal (e.g., sapphire), or a transparent polymer (e.g., plastic) that enables a user to view the display 104 through the front cover 106. In some cases, a portion of the front cover 106 (e.g., a perimeter portion of the front cover 106) may be coated with an opaque ink to obscure components included within the housing 102. The rear cover 108 may be formed using the same material(s) that are used to form the sidewall 118 or the front cover 106, or may be formed using a different material or materials. In some cases, the rear cover 108 may be part of a monolithic element that also forms the sidewall 118 (or in cases where the sidewall 118 is a multi-segment sidewall, those portions of the sidewall 118 that are non-conductive). In still other embodiments, all of the exterior components of the housing 102 may be formed from a transparent material, and components within the device 100 may or may not be obscured by an opaque ink or opaque structure within the housing 102.

The front cover 106 may be mounted to the sidewall 118 to cover an opening defined by the sidewall 118 (i.e., an opening into an interior volume in which various electronic components of the device 100, including the display 104, may be positioned). The front cover 106 may be mounted to the sidewall 118 using fasteners, adhesives, seals, gaskets, or other components.

A display stack or device stack (hereafter referred to as a "stack") including the display 104 (and in some cases the front cover 106) may be attached (or abutted) to an interior surface of the front cover 106 and extend into the interior volume of the device 100. In some cases, the stack may also include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 106 (e.g., to a display surface of the device 100).

The stack may also include an image sensor 116 having pixels that are positioned in front of or behind, or interspersed with, the light-emitting elements of the display 104. In some cases, the image sensor 116 may extend across an area equal in size to the area of the display 104. Alternatively, the image sensor 116 may extend across an area that is smaller than or greater than the area of the display 104, or may be positioned entirely adjacent the display 104. Although the image sensor 116 is shown to have a rectangular boundary, the image sensor 116 could alternatively have a boundary with a different shape, including, for example, an irregular shape. The image sensor 116 may be variously configured as an ambient light sensor, an organic light-emitting element diode (e.g., OLED) health sensor (e.g., an OLED age sensor), a touch sensor, a health sensor, a biometric sensor (e.g., a fingerprint sensor or facial recognition sensor), a camera, a depth sensor, and so on. The image sensor 116 may also or alternatively function as a proximity sensor, for determining whether an object (e.g., a finger, face, or stylus) is proximate to the front cover 106. In some embodiments, the image sensor 116 may provide the touch sensing capability (i.e., touch sensor) of the stack.

In some cases, a force sensor (or part of a force sensor system) may be positioned within the interior volume below and/or to the side of the display 104 (and in some cases within the stack). The force sensor (or force sensor system) may be triggered in response to the touch sensor detecting one or more touches on the front cover 106 (or indicating a location or locations of one or more touches on the front cover 106), and may determine an amount of force associated with each touch, or an amount of force associated with the collection of touches as a whole.

As shown primarily in FIG. 1A, the device 100 may include various other components. For example, the front of the device 100 may include one or more front-facing cameras 110 (including one or more image sensors), speakers 112, microphones, or other components 114 (e.g., audio, imaging, and/or sensing components) that are configured to transmit or receive signals to/from the device 100. In some cases, a front-facing camera 110, alone or in combination with other sensors, may be configured to operate as a bio-authentication or facial recognition sensor. Additionally or alternatively, the image sensor 116 may be configured to operate as a front-facing camera, a bio-authentication sensor, or a facial recognition sensor.

The device 100 may also include buttons or other input devices positioned along the sidewall 118 and/or on a rear surface of the device 100. For example, a volume button or multipurpose button 120 may be positioned along the sidewall 118, and in some cases may extend through an aperture in the sidewall 118. The sidewall 118 may include one or more ports 122 that allow air, but not liquids, to flow into and out of the device 100. In some embodiments, one or more sensors may be positioned in or near the port(s) 122. For example, an ambient pressure sensor, ambient temperature sensor, internal/external differential pressure sensor, gas sensor, particulate matter concentration sensor, or air quality sensor may be positioned in or near a port 122.

In some embodiments, the rear surface of the device 100 may include a rear-facing camera 124. A flash or light source 126 may also be positioned along the rear of the device 100 (e.g., near the rear-facing camera). In some cases, the rear surface of the device 100 may include multiple rear-facing cameras.

The device 100 may include circuitry 128 (e.g., a processor and/or other components) configured to determine or extract, at least partly in response to signals received directly or indirectly from one or more of the device's sensors, biological parameters of the device's user, a status of the device 100, parameters of an environment of the device 100 (e.g., air quality), a composition of a target or object, or one or more images, for example. In some embodiments, the circuitry 128 may be configured to convey the determined or extracted parameters, statuses, or images via an output device of the device 100. For example, the circuitry 128 may cause the parameters, statuses, or images to be displayed on the display 104, indicated via audio or haptic outputs, transmitted via a wireless communications interface or other communications interface, and so on. The circuitry 128 may also or alternatively maintain or alter one or more settings, functions, or aspects of the device 100, including, in some cases, what is displayed on the display 104.

Figure 2:
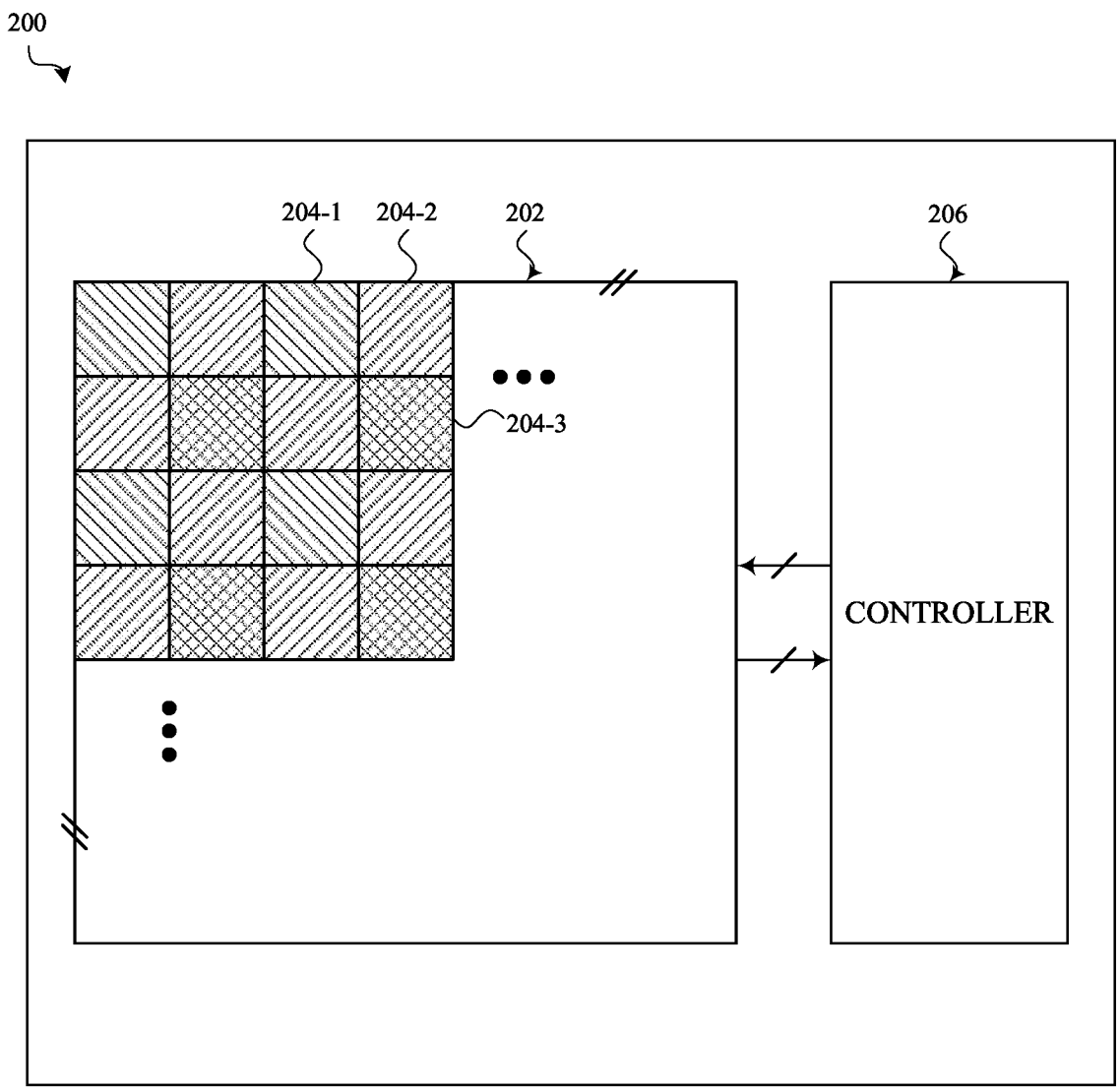
FIG. 2 shows a plan view of an example image sensor.
Figure 2:
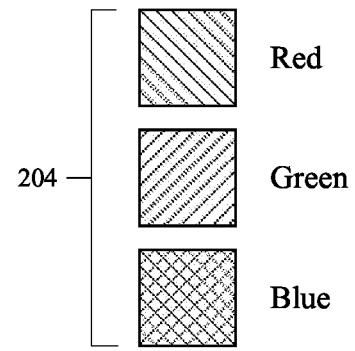

FIG. 2 shows a plan view of an example image sensor 200. In some embodiments, the image sensor 200 may be an image sensor used in one of the cameras described with reference to FIGS. 1A and 1B. In some cases, the image sensor 200 may be a complementary metal-oxide semiconductor (CMOS) image sensor.

The image sensor 200 may include an array of pixels 202. The array of pixels 202 may include a set of filter elements 204 arranged in a filter pattern. Different subsets of pixels in the array of pixels 202 may receive light through different types of filter elements in the set of filter elements 204. In some embodiments, the different types of filter elements may include red filter elements 204-1, green filter elements 204-2, and blue filter elements 204-3 (i.e., RGB filter elements), which filter elements 204 may be arranged in a Bayer color filter pattern. In some embodiments, the different types of filter elements may include other types of colored filter elements (e.g., cyan-yellow-green-magenta (CYGM) filter elements), or types of filter elements that vary by other than color (e.g., infrared (IR) or ultraviolet (UV) filter elements). Alternatively, the array of pixels 202 may receive unfiltered light, or the array of pixels 202 may receive light that is filtered in the same or similar ways (e.g., filtered in a monochrome manner).

The image sensor 200 may also include a singular or distributed controller 206 (e.g., one or more control circuits) for controlling a shutter, exposure, or integration time of the array of pixels 202; for operating the array of pixels 202 in a particular mode (e.g., a high resolution mode or a high gain mode); for performing a readout of the array of pixels 202; and so on.

Figure 3:
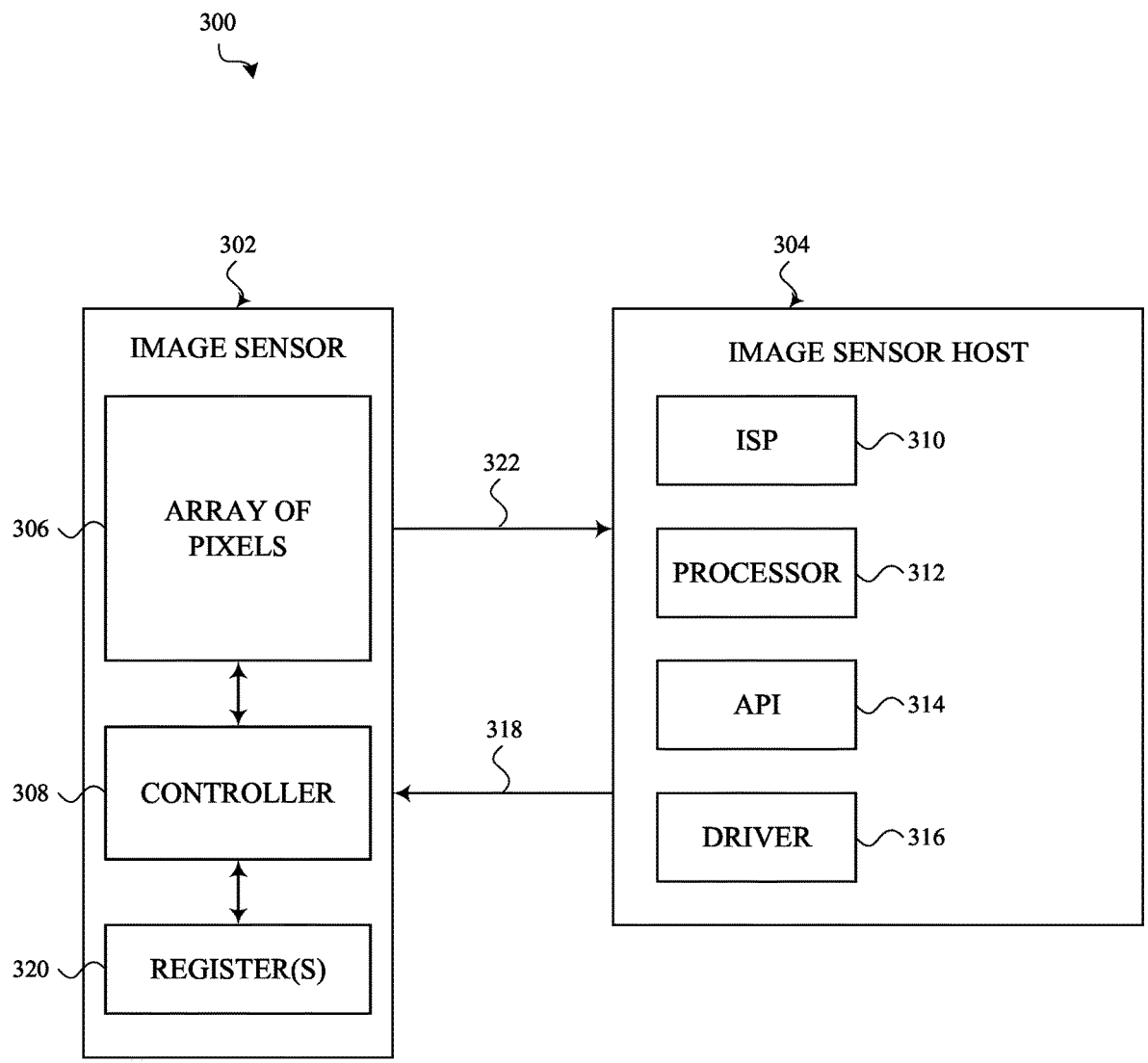
FIG. 3 shows an example block diagram of an image sensor in communication with an image sensor host.

FIG. 3 shows an example block diagram 300 of an image sensor 302 in communication with an image sensor host 304. In some embodiments, the image sensor 302 may be an image sensor used in one of the cameras described with reference to FIGS. 1A and 1B, or the image sensor described with reference to FIG. 2.

The image sensor 302 may include an array of pixels 306 and a controller 308, as described with reference to FIG. 2. The image sensor host 304 may be or include one or more of an image sensor processor (ISP) 310 (e.g., a System on Chip (SoC) or application-specific integrated circuit (ASIC)), a system processor 312 (e.g., a microprocessor), an application programming interface 314, an image sensor (or camera) driver 316, and so on.

The image sensor host 304 may control or program the image sensor 302 via an interface 318. In some cases, the interface 318 may be a two-wire I2C interface or other type of serial communication interface. In some cases, the image sensor host 304 may write to a set of one or more programming registers 320 via the interface 318. Although the programming register(s) 320 are shown to be part of the image sensor 302, the programming register(s) may alternatively be provided apart from the image sensor 302, or as part of the image sensor host 304. In the latter case, the programming register(s) may be programmed locally, by the image sensor host 304, and accessed by the image sensor 302 over the interface 318.

In some cases, the image sensor host 304 may also read (receive) settings or parameters of the image sensor 302 over the interface 318. For example, the controller 308 may write to various status registers which may be read by the image sensor host 304.

The image sensor host 304 may receive image frame data, generated by the image sensor 302, over another interface 322. In some embodiments, the interface 322 may be a four-lane ALPDP-C interface.

The image sensor host 304 may write to the programming register(s) 320 at various times. The controller 308 may be in read communication (and in some cases write communication) with the programming register(s), and may use some of the values written to the programming register(s) 320 to configure the array of pixels 306 for capturing an image frame. For example, the controller 308 may use one or more of the values written to the programming register(s) 320 to configure an integration time for the pixels in the array of pixels 306. The controller 308 may also use one or more of the values to configure a frame duration for capturing an image frame using the array of pixels 306. The controller 308 may further use one or more of the values to configure a per pixel, per line of pixels, or per array of pixels gain. One or more of the values may also be used to trigger a truncation of an image sensor.

Figure 4:
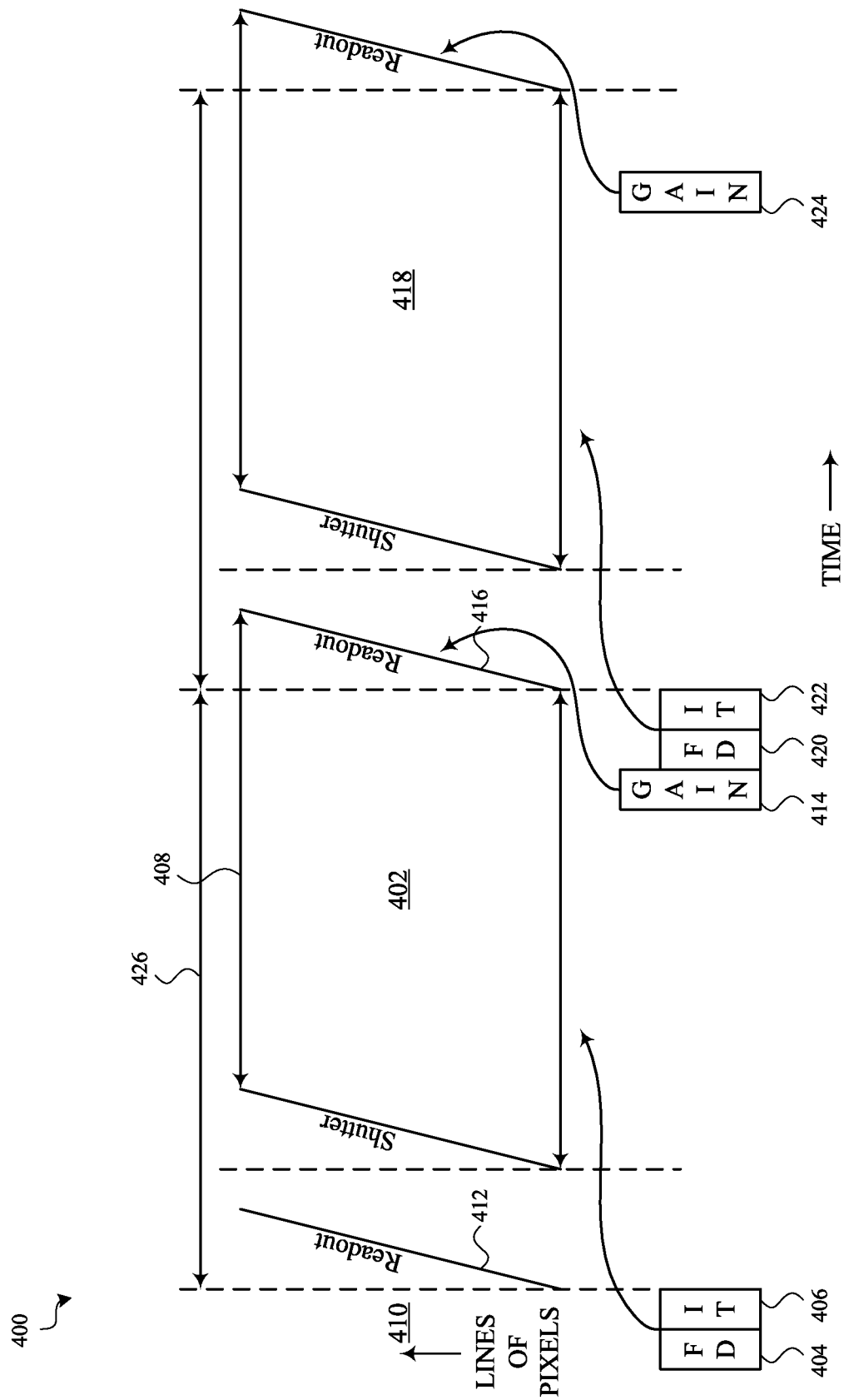
FIG. 4 shows an example integration and readout timing for a rolling shutter image sensor.

FIG. 4 shows an example integration and readout timing 400 for a rolling shutter image sensor. Prior to capturing an image frame 402, an image sensor host may write values 404, 406 indicating a frame duration (FD) 426 and a duration of an integration time (IT) 408 into a set of one or more programming registers for the image sensor. The image sensor and image sensor host may in some cases be the image sensor and image sensor host described with reference to FIG. 3. In some cases, the values 404, 406 may be written during the capture of a preceding image frame 410, such as just before beginning a readout 412 of the preceding image frame 410. Alternatively, the values 404, 406 may be written during readout 412 of the preceding image frame 410 or between the readout 412 of the preceding image frame 410 and the start of the image frame 402. A controller of the image sensor may read the values 404, 406 (and in some cases other values) and operate an array of pixels of the image sensor to capture the image frame 402.

In a rolling shutter image sensor, operating the array of pixels to capture the image frame 402 may involve enabling a first line of pixels to collect electromagnetic radiation for the duration of the integration time 408, then enabling a second line of pixels to collect electromagnetic radiation, and so on in a rolling line-by-line manner. When the duration of the integration time 408 has been reached for the first line of pixels, a set of pixel values for the first line of pixels may be read out. A set of pixel values for a second line of pixels may be read out when the duration of the integration time has been reached for the second line of pixels, and so on until a set of pixel values has been read out for all of the lines of pixels in the array of pixels. In some cases, the image sensor host may write a gain value 414 into the set of one or more programming registers, prior to beginning the readout 416 of the image frame 402, and the controller of the image sensor may read out a set of pixel values for each line of pixels in accord with the gain value 414.

After a delay between the end of the integration time 408 and the end of the frame duration (indicated by the value 404), the controller may operate the array of pixels to capture a subsequent image frame 418. The subsequent image frame 418 may be captured with the same FD, IT, and gain values 404, 406, 414 used to capture the image frame 402, or the image sensor host may write new FD, IT, or gain values 420, 422, 424 to the set of one or more programming registers for the subsequent image frame.

Figure 5A:
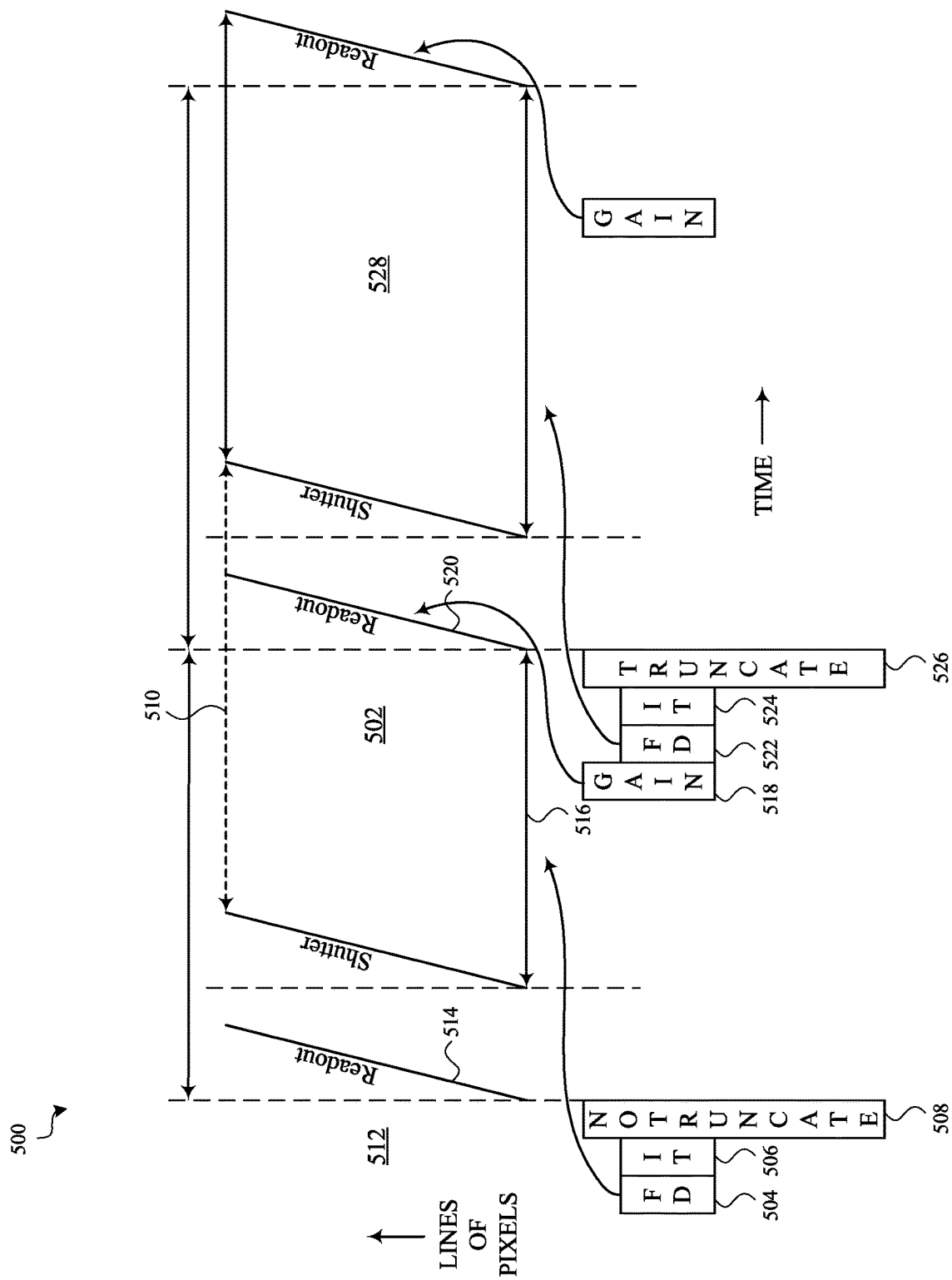
FIGS. 5A, 5B, 5C, 5D, and 5E show example variations in the integration and readout timing shown in FIG. 4, wherein the variations are triggered by a decision to truncate the duration of an integration time for an image frame.
Figure 5B:
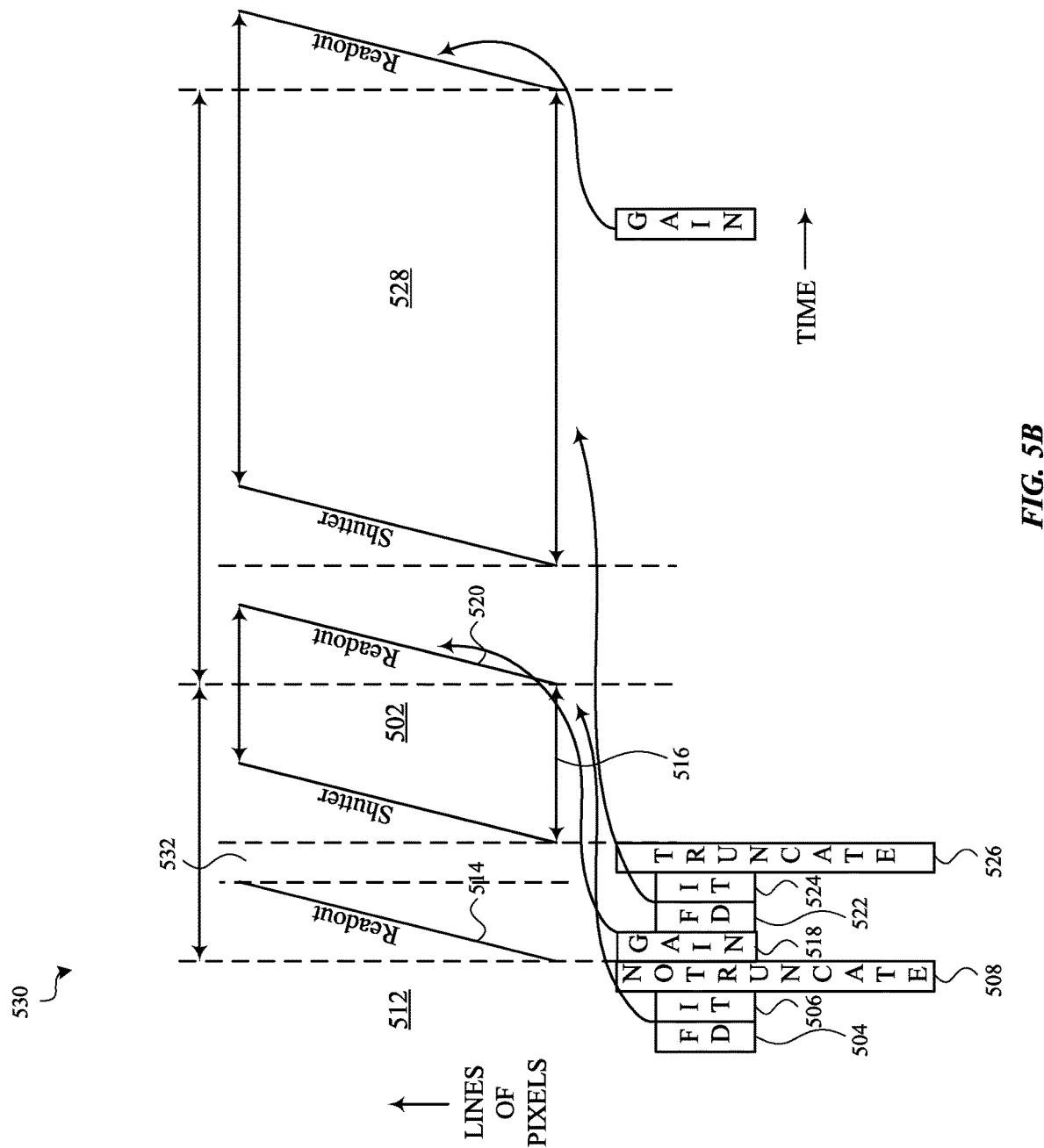
Figure 5C:
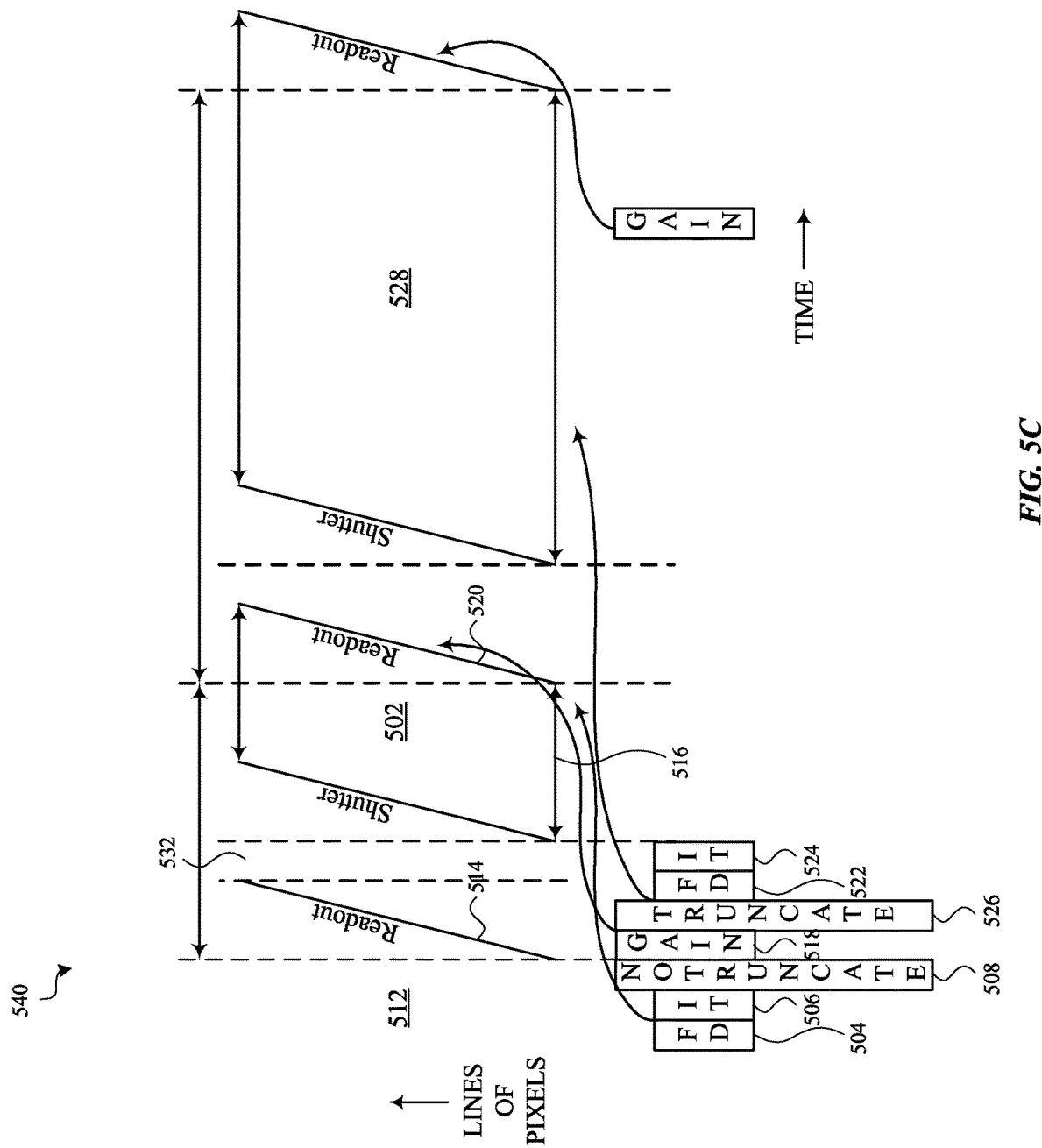

In some cases, the duration of the integration time may be longer than a minimum duration. For example, in a low light setting, the duration of the integration time may be a full second or more. An integration time of this duration may only be useful if a device that includes the image sensor is very still (e.g., mounted on a tripod). If the device including the image sensor is moved, or if a subject being photographed moves, an image frame captured in accord with a one second integration time may contain blur, which is generally considered undesirable. As a result, it may be useful to truncate an integration time for an image frame if the image sensor host or a user determines that the image sensor has moved or is moving, or if a subject being photographed moves, or if the lighting conditions change (e.g., from low light to brighter light), or if the image sensor host or user simply determines that capturing an image frame in accord with an integration time having a longer duration is no longer necessary. In these cases, it may be useful to truncate the duration of an integration time. For example, a one second integration time may be truncated to 0.1 microsecond (μs) or some other duration less than one second. In this regard, FIGS. 5A, 5B, and 5C show example variations in the integration and readout timing shown in FIG. 4. The variations may be triggered by a decision to truncate the duration of an integration time for an image frame. For purposes of this description, a "decision to truncate" is a decision to, when allowed, initiate a reduction of the integration time of an image frame. There may be times, however, when an image sensor does not allow the integration time of an image frame to be truncated. The execution of a decision to truncate may vary based on context, as described with reference to FIGS. 5A-5E, below.

FIG. 5A shows a first example truncated integration and readout timing 500 for a rolling shutter image sensor. Prior to capturing an image frame 502, an image sensor host may write values 504, 506, 508 indicating a frame duration (FD), a duration of an integration time (IT) 510, and an exposure truncate decision into a set of one or more programming registers for the image sensor. The image sensor and image sensor host may in some cases be the image sensor and image sensor host described with reference to FIG. 3. In some cases, the values 504, 506, 508 may be written during the capture of a preceding image frame 512, such as just before beginning a readout 514 of the preceding image frame 512. Alternatively, the values 504, 506, 508 may be written during readout 514 of the preceding image frame 512 or between the readout 514 of the preceding image frame 512 and the start of the image frame 502. A controller of the image sensor may read the values 504, 506, 508 (and in some cases other values) and, if the value of the exposure truncate decision indicates a decision not to truncate, operate an array of pixels of the image sensor to capture the image frame 502.

In a rolling shutter image sensor, operating the array of pixels to capture the image frame 502 may include enabling a first line of pixels to collect electromagnetic radiation for the duration of the integration time 510, then enabling a second line of pixels to collect electromagnetic radiation, and so on in a rolling line-by-line manner. However, in the timing diagram 500, the image sensor host adjusts the value 508 of the exposure truncate decision, in the set of one or more programming registers, to indicate a "decision to truncate". The adjustment to the exposure truncate decision is made after the controller begins operating the array of pixels to capture the image frame 502, and during the integration time 510. The controller for the image sensor may monitor the programming register(s) for adjustments in the value 508 indicating the decision to truncate (e.g., via assertion detection) and, upon determining that a decision to truncate has been made, proceed to truncate the duration of the integration time 510 for the image frame 502. The integration time 510 may be truncated to a truncated integration time 516 that is shorter than the integration time 510 (i.e., the integration time for the image frame 502 may be stopped before satisfying the duration of the integration time 510). The controller may initiate the truncation immediately, or at a next acceptable time, or at one of a number of predetermined truncation times. An "acceptable" truncation time may be, for example, a time that allows all of the pixels in the array of pixels to be properly read out. In some cases, this may be after the controller has read a gain value 518 for the readout 520, or after the controller has also read values 522, 524, 526 for a frame duration, integration time, or exposure truncation decision for a subsequent image frame 528 following the image frame 502.

After the controller determines a decision to truncate has been made, the controller may initiate a readout 520 of the image frame 502. The readout 520 may be performed similarly to the readout of the image frame described with reference to FIG. 4, with the integration time for each line of pixels being truncated after a same truncated integration time. In some cases, the controller may also operate the array of pixels in accord with a truncated frame duration, as shown. After performing the readout 520 (or after determining the decision to truncate has been made, the controller may clear or reset the value 508 back to the "decision not to truncate" state. Following the readout 520, the controller may operate the array of pixels to capture a subsequent image frame 528 (again, similarly to how the subsequent image frame is captured in FIG. 4).

In an alternative embodiment of the timing diagram 500, the controller may skip the readout 520 of pixel values for the image frame and clear the pixel values before capturing the subsequent image frame 528. In further alternative embodiments, the controller may be programmed to conditionally act on a decision to truncate, or even disable the truncation option. For example, an image sensor may be operable in different photography or video modes (e.g., in a slow-motion mode, a high dynamic range (HDR) mode, a night mode, a tripod mode, and so on). Because a decision to truncate an image frame may have a greater effect or provide more value for some modes, a decision to truncate may be executed for an image frame acquired in one mode, but not for an image frame acquired in another mode (or alternatively, a truncation option may be provided for one mode, but not provided for another mode). For example, a decision to truncate may save time and allow a more useful image frame to be captured when it has been determined that a long-exposure will be adversely affected by image sensor movement; but, a decision to truncate may save little or no time when an image frame is captured with a short integration time in bright light. How a decision to truncate is executed (e.g., by truncating an image frame and reading it out, or by truncating an image frame and not reading it out) may also depend on the mode in which an image frame is being acquired.

In some cases, a decision to truncate may be received after a readout has started (e.g., during readout 520). In these cases, the truncate decision may be ignored for the current image frame and affect the duration of an integration time for a next image frame, or the truncate decision may be ignored altogether.

In some cases, the image sensor's controller may write to one or more status registers which may be read by the image sensor host. Values written to the status registers may indicate, for example, whether an integration time was truncated for a particular image frame, and the duration of the truncated integration time.

FIG. 5B shows a second example truncated integration and readout timing 530. The timing diagram 530 is similar to the timing diagram described with reference to FIG. 5A, but for the timing of the decision to truncate. In the timing diagram 530, the image sensor host adjusts the value 508, to indicate a decision to truncate, prior to the image frame 502. Upon determining that the decision to truncate has been made, the controller for the image sensor may determine that a period of time before it begins to capture the image frame 502 is less than a threshold period of time 532. In this scenario, the controller may operate the array of pixels to capture the image frame 502, but may operate the array of pixels in accord with a truncated integration time (i.e., an integration time having a duration that is less than the duration indicated by the value 506). The controller may also operate the array of pixels in accord with a truncated frame duration. The duration of the truncated integration time (i.e., the truncated duration) may in some cases be a minimum acceptable duration. In some embodiments, the minimum acceptable duration may be stored as another value in the set of one or more programming registers.

FIG. 5C shows a third example truncated integration and readout timing 540. The timing diagram 540 is similar to the timing diagram described with reference to FIG. 5B, but for the timing of the decision to truncate. In the timing diagram 540, the image sensor host adjusts the value 508, to indicate a decision to truncate, prior to the image frame 502. Upon determining that the decision to truncate has been made, the controller for the image sensor may determine that a period of time before it begins to capture the image frame 502 is greater than a threshold period of time 532. In this scenario, the controller may skip what was to be the image frame 502 and operate the array of pixels to capture the subsequent image frame (image frame 528 in FIG. 5B) as the image frame 502. Prior to capturing the image frame 502, the controller may read new values 522, 524, 526 for a frame duration, integration time, or exposure truncation decision for the image frame 502.

Figure 5D:
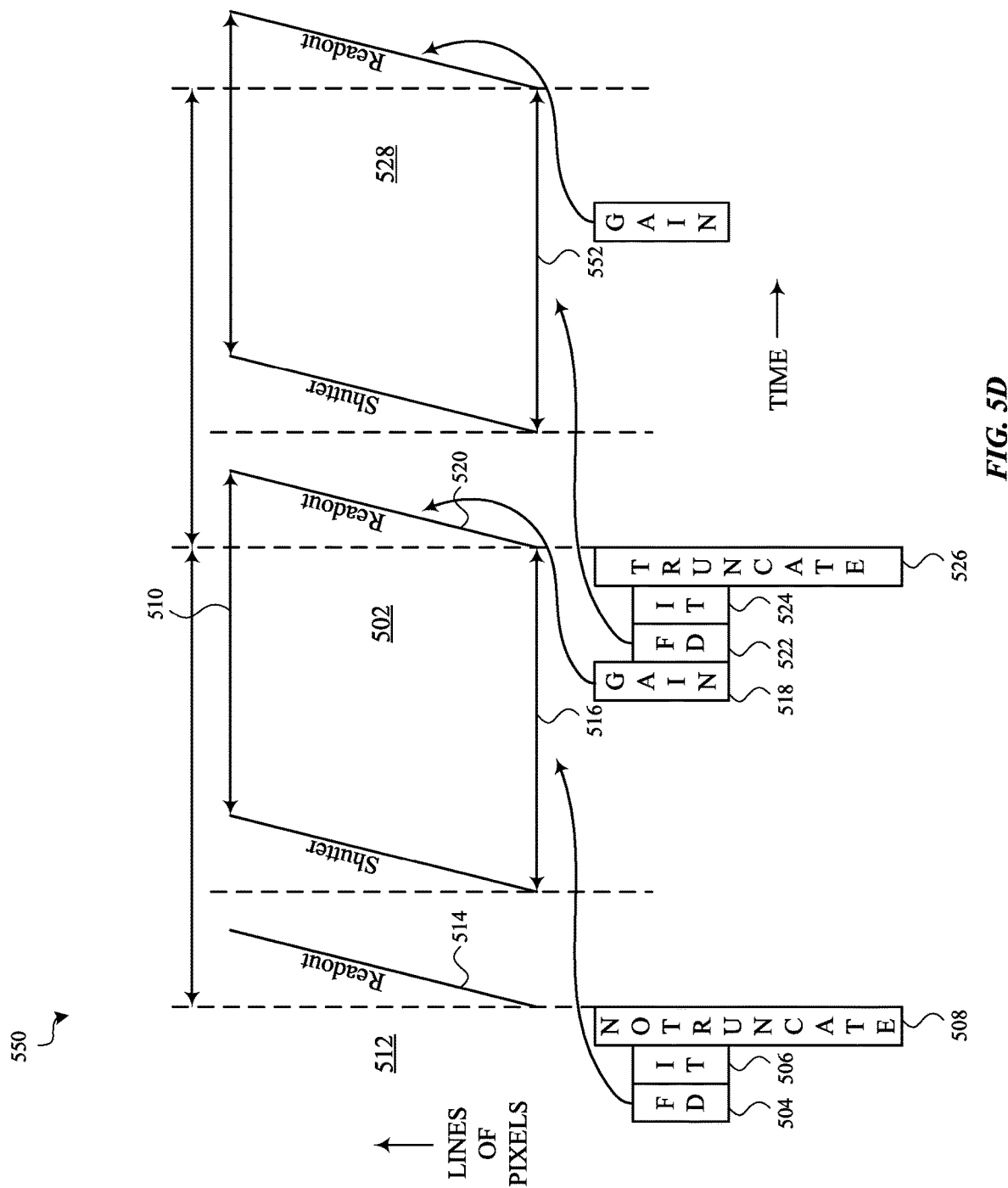

FIG. 5D shows a fourth example truncated integration and readout timing 550. The timing diagram 550 is similar to the timing diagram described with reference to FIG. 5A, but for the effect of the decision to truncate. In the timing diagram 550, the image frame 502 and the subsequent image frame 528 are grouped (which grouping may be indicated by yet another value stored in the programming register(s)). Because the image frame 502 and the subsequent image frame 528 are grouped, the controller for the image sensor may capture the subsequent image frame 528 using the same integration time that was used for the image frame 502 (i.e., the controller may use the truncated integration time for capturing the image frame 502 as the integration time 552 for the subsequent image frame 528). The controller may use the truncated integration time for any number of image frames that are grouped with the image frame 502. Alternatively, the controller may capture the subsequent image frame 528 using an integration time indicated by the value 506 stored in the programming register(s). Alternatively, and in scenarios in which the image frame 502 is grouped with the preceding image frame 512, the controller may in some cases ignore the decision to truncate, thereby using the same integration time for capturing the preceding image frame 512 and the image frame 502.

As an example, a controller may truncate each image in a set of grouped image frames when the image frames relate to a high dynamic range (HDR) exposure that includes different image frames captured with different exposure value (ev; e.g., ev+ and ev−) settings. As another example, a controller might be programmed to ignore a decision to truncate when one of the image frames related to an HDR exposure has already been captured, or in a slow-motion mode where an image frame may not be substantially affected by a truncation, or when a relatively short duration image frame is being captured in bright light.

Figure 5E:
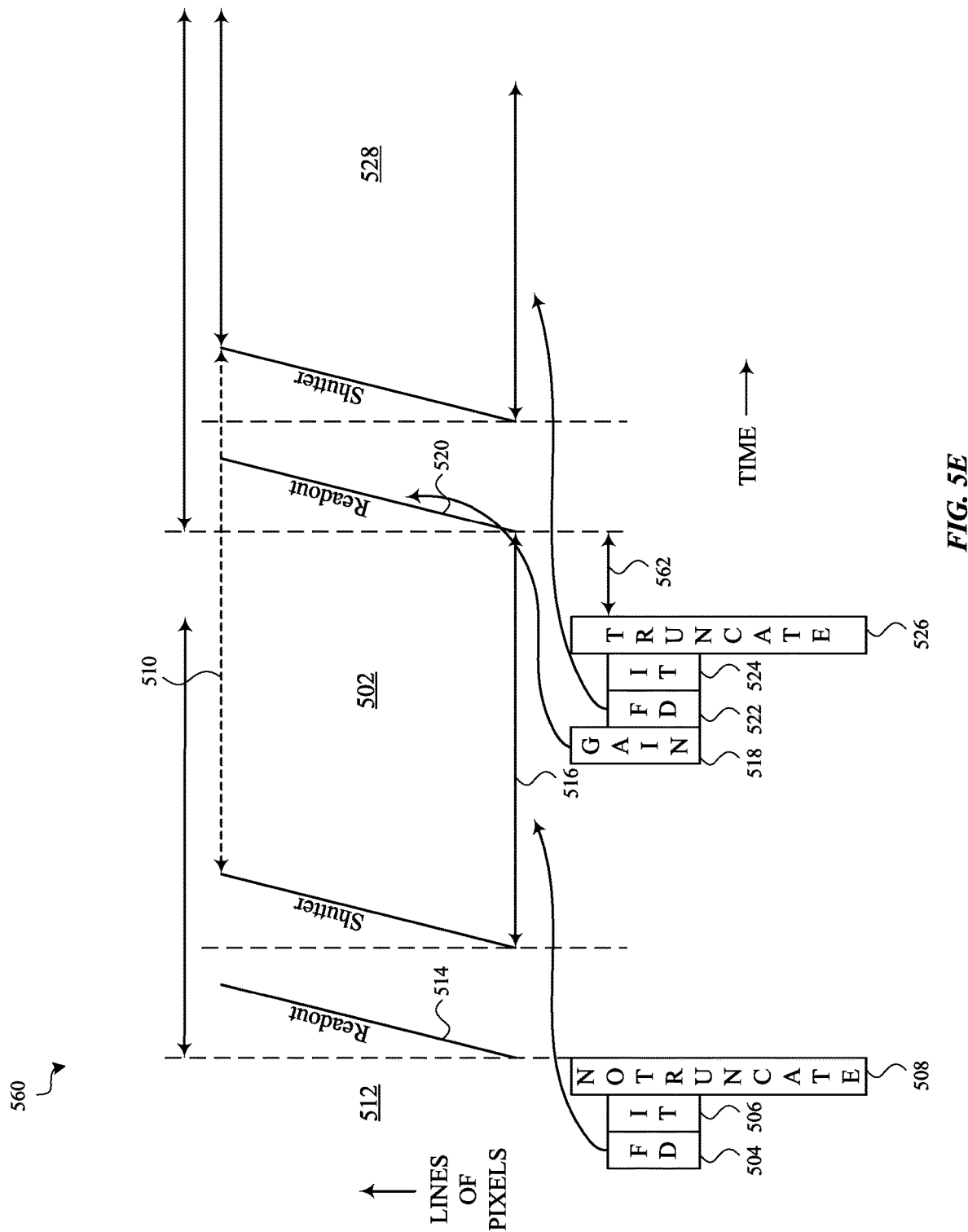

FIG. 5E shows a fifth example truncated integration and readout timing 560. The timing diagram 560 is similar to the timing diagram described with reference to FIG. 5A, but for the timing of the truncation of the image frame 502. As shown in FIG. 5E, the image frame 502 is not truncated immediately upon receipt of the decision to truncate (i.e., immediately upon a readout of the value 526). Instead, truncation of the image frame 502 is delayed by a time period 562, so that the truncation can be performed at an acceptable time that enables a successful readout 520.

As shown and described with reference to each of FIGS. 5A-5E, a value 524 that indicates an integration time may be written to a programming register. In some cases, a value 524 indicating a new (e.g., shorter) integration time may be written to a programming register along with a value 526 indicating a decision to truncate. In these cases, the new integration time may in some cases be applied to a current image frame 502 (i.e., to a truncated frame). However, a current image frame may also be truncated at an earliest allowable time, or in accord with one or more other truncation rules, apart from any value 526 that indicates a new integration time.

Figure 6:
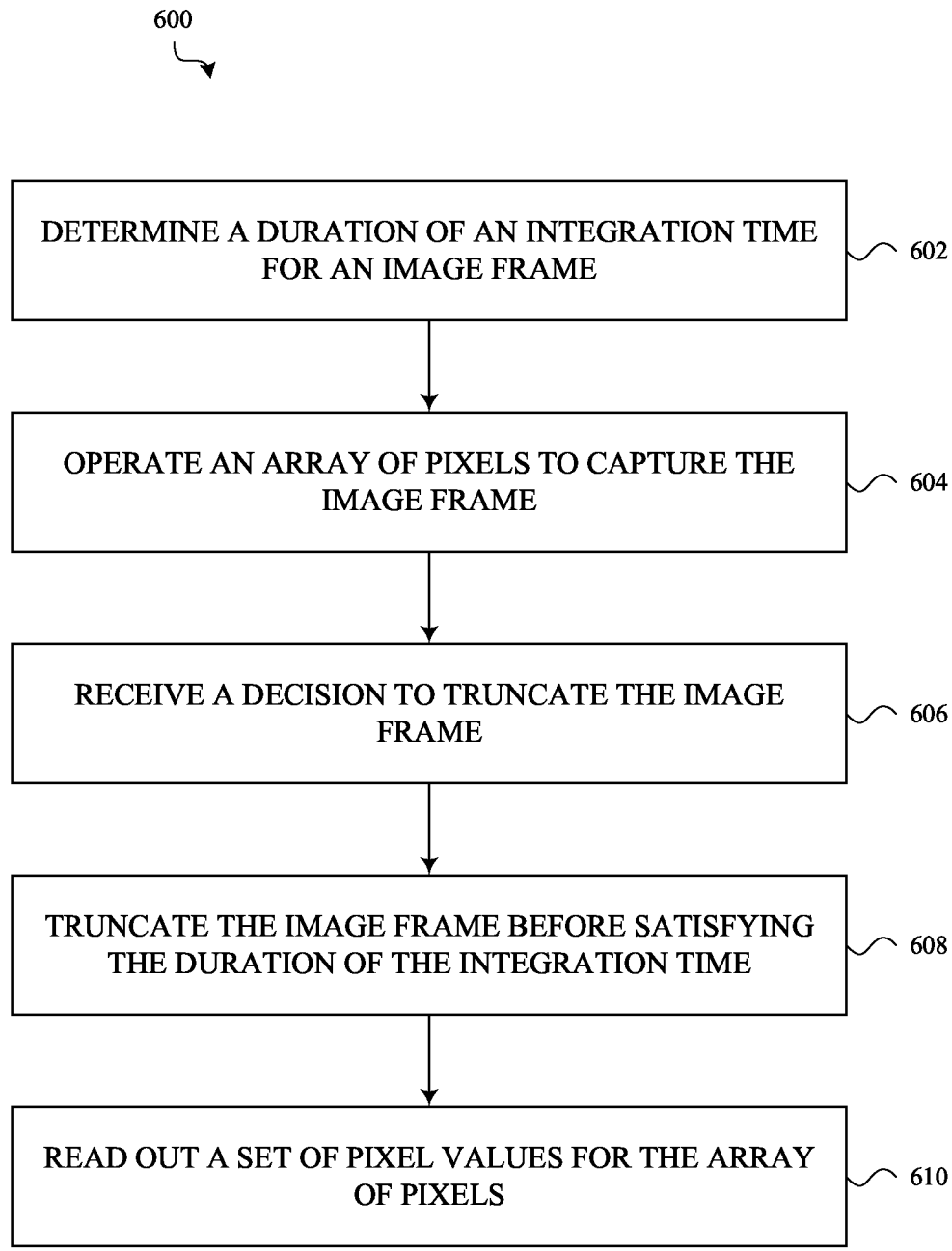
FIG. 6 shows an example method of operating an image sensor.

FIG. 6 shows an example method 600 of operating an image sensor. The method 600 may be performed, for example, by the controller of the image sensor described with reference to FIGS. 2-5E.

At block 602, the method 600 may include determining a duration of an integration time for an image frame.

At block 604, the method 600 may include operating an array of pixels to capture the image frame.

At block 606, the method 600 may include receiving a decision to truncate the image frame.

At block 608, the method 600 may include truncating the image frame before satisfying the duration of the integration time. In some cases, each pixel in the array of pixels may be exposed for a same truncated integration time, with the truncated integration time having a truncated duration shorter than the determined duration.

At block 610, the method 600 may optionally include reading out a set of pixel values for the array of pixels.

In some embodiments of the method 600, the decision to truncate may be received after beginning the integration time for the image frame. However, in other embodiments, the decision to truncate may be received before beginning the integration of the image frame. In these latter embodiments, the image frame may in some cases be captured in accord with a truncated integration time having a predetermined duration that is less than the duration determined at block 602.

In some embodiments of the method 600, the image frame may be grouped with a subsequent image frame that follows the image frame. In these embodiments, the subsequent image frame may be captured using the same truncated integration time used for the image frame. Other image frames that are grouped with the image frame may also use the same truncated integration time. In other embodiments, the integration time determined at block 602, or a different integration time provided for the subsequent image frame, may be used to capture the subsequent image frame.

In some cases, an electronic device that includes an image sensor may have a user input device (e.g., the button, touch sensor, force sensor, or display of the device described with reference to FIGS. 1A and 1B, or one of the I/O mechanisms described with reference to FIG. 7), and an image sensor host may be configured to monitor for a user input provided to the user input device and, upon determining that the user input has been provided to the user input device, provide a decision to truncate (e.g., adjust the value of an exposure truncation decision stored in a programming register).

In some cases, an image sensor host may be configured to detect movement of an electronic device that includes an image sensor, and provide a decision to truncate upon detecting movement exceeding a threshold movement. For example, the image sensor host, or a sensor that is coupled to the image sensor host, may be configured to detect vibrations, shakes, or other movements of the device. Additionally or alternatively, the image sensor host, or a presence detect sensor that is coupled to the image sensor host, may be configured to detect when a tripod is no longer connected to the device. Removal of a device from a tripod would typically suggest that the device is going to be subject to a greater range of movement.

In some cases, an image sensor host, or a sensor that is coupled to the image sensor host, may be configured to detect a change in an ambient lighting condition and provide a decision to truncate upon detecting a predetermined change in the ambient lighting condition.

Figure 7:
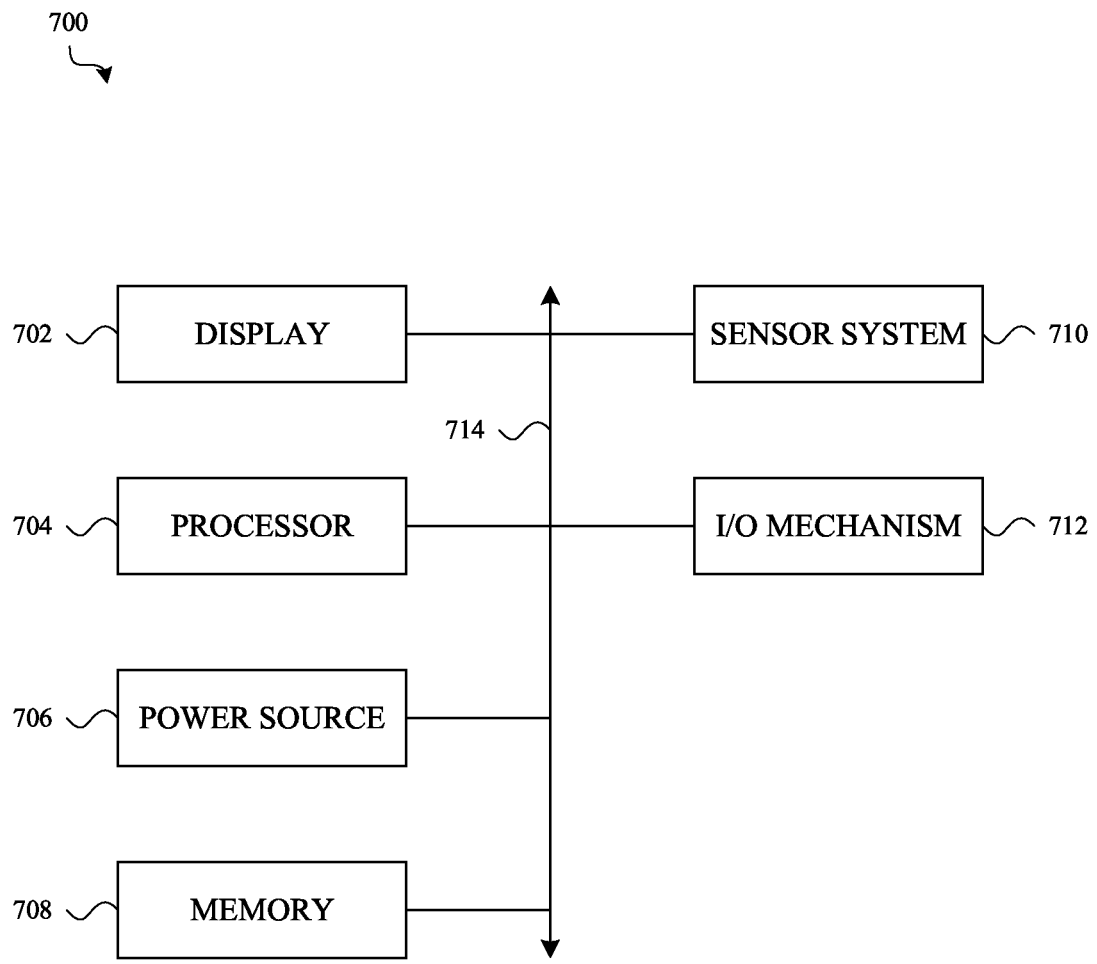
FIG. 7 shows an example block diagram of an electronic device.

FIG. 7 shows an example block diagram of an electronic device 700, which in some cases may be the electronic device described with reference to FIGS. 1A and 1B. The electronic device 700 may include an electronic display 702 (e.g., a light-emitting display), a processor 704, a power source 706, a memory 708 or storage device, a sensor system 710, and/or an input/output (I/O) mechanism 712 (e.g., an input/output device, input/output port, or haptic input/output interface). The processor 704 may control some or all of the operations of the electronic device 700. The processor 704 may communicate, either directly or indirectly, with some or all of the other components of the electronic device 700. For example, a system bus or other communication mechanism 714 can provide communication between the electronic display 702, the processor 704, the power source 706, the memory 708, the sensor system 710, and the I/O mechanism 712.

The processor 704 may be implemented as any electronic device capable of processing, receiving, or transmitting data or instructions, whether such data or instructions is in the form of software or firmware or otherwise encoded. For example, the processor 704 may include a microprocessor, a central processing unit (CPU), an ASIC, a digital signal processor (DSP), a controller, or a combination of such devices. As described herein, the term "processor" is meant to encompass a single processor or processing unit, multiple processors, multiple processing units, or other suitably configured computing element or elements. In some cases, the processor 704 may provide part or all of the processing system or processor described herein.

It should be noted that the components of the electronic device 700 can be controlled by multiple processors. For example, select components of the electronic device 700 (e.g., the sensor system 710) may be controlled by a first processor and other components of the electronic device 700 (e.g., the electronic display 702) may be controlled by a second processor, where the first and second processors may or may not be in communication with each other.

The power source 706 can be implemented with any device capable of providing energy to the electronic device 700. For example, the power source 706 may include one or more batteries or rechargeable batteries. Additionally or alternatively, the power source 706 may include a power connector or power cord that connects the electronic device 700 to another power source, such as a wall outlet.

The memory 708 may store electronic data that can be used by the electronic device 700. For example, the memory 708 may store electrical data or content such as, for example, audio and video files, documents and applications, device settings and user preferences, timing signals, control signals, instructions, and/or data structures or databases. The memory 708 may include any type of memory. By way of example only, the memory 708 may include random access memory, read-only memory, Flash memory, removable memory, other types of storage elements, or combinations of such memory types.

The electronic device 700 may also include one or more sensor systems 710 positioned almost anywhere on the electronic device 700. The sensor system(s) 710 may be configured to sense one or more types of parameters, such as but not limited to, vibration; light; touch; force; heat; movement; relative motion; biometric data (e.g., biological parameters) of a user; air quality; proximity; position; connectedness; surface quality; and so on. By way of example, the sensor system(s) 710 may include an SMI sensor, a heat sensor, a position sensor, a light or optical sensor, an accelerometer, a pressure transducer, a gyroscope, a magnetometer, a health monitoring sensor, and an air quality sensor, and so on. Additionally, the one or more sensor systems 710 may utilize any suitable sensing technology, including, but not limited to, interferometric, magnetic, capacitive, ultrasonic, resistive, optical, acoustic, piezoelectric, or thermal technologies.

The I/O mechanism 712 may transmit or receive data from a user or another electronic device. The I/O mechanism 712 may include the electronic display 702, a touch sensing input surface, a crown, one or more buttons (e.g., a graphical user interface "home" button), one or more cameras (e.g., one of the image sensors and image sensor hosts described herein), one or more microphones or speakers, one or more ports such as a microphone port, and/or a keyboard. Additionally or alternatively, the I/O mechanism 712 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. An image sensor, comprising:
an array of pixels;
a set of one or more programming registers configured to store,
a first value indicating a duration of an integration time; and
a second value indicating an exposure truncate decision; and
a controller in read communication with the set of one or more programming registers and configured to,
monitor the second value;
determine, prior to beginning the capture of the image frame, that the second value indicates a decision not to truncate;
operate the array of pixels in accord with the first value to begin capturing the image frame;
after beginning to capture the image frame, determine that the second value has been adjusted to indicate a decision to truncate; and
truncate the capture of the image frame before satisfying the duration of the integration time indicated by the first value.

2. The image sensor of claim 1, wherein the controller is configured to initiate a readout of the array of pixels after beginning the truncation.

3. The image sensor of claim 1, wherein the controller is configured to operate the array of pixels to capture the image frame in accord with a rolling shutter.

4. The image sensor of claim 3, wherein the controller is configured to truncate the capture of the image frame by truncating an integration time of each line of pixels in the array of pixels after a same truncated integration time.

5. The image sensor of claim 1, wherein:
the image frame is grouped with a subsequent image frame that follows the image frame; and
the controller is configured to, after truncating the capture of the image frame, capture the subsequent image frame using a same truncated integration time used to capture the image frame.

6. The image sensor of claim 1, wherein:
the set of one or more programming registers is configured to store a third value indicating a truncated duration of a truncated integration time; and
the controller is configured to,
determine that the second value indicates a decision to truncate; and
operate the array of pixels in accord with the third value to capture the image frame.

7. The image sensor of claim 1, wherein the decision to truncate is received at the set of one or more programming registers, from an image sensor host, in response to at least one of:
movement of the image sensor exceeding a threshold movement;
removal of the image sensor from a tripod; or
detection of a predetermined change in an ambient lighting condition.

8. The image sensor of claim 1, wherein the controller is configured to reset the second value after capture of the image frame.

9. An image sensor, comprising:
an array of pixels;
a set of one or more programming registers configured to store,
a first value indicating a duration of an integration time for an image frame; and
a second value indicating an exposure truncate decision; and
a controller in read communication with the set of one or more programming registers and configured to,
monitor the second value;
determine, prior to beginning capture of the image frame, that the second value indicates a decision to truncate; and
skip capturing the image frame.

10. The image sensor of claim 9, wherein:
the image frame is grouped with a subsequent image frame that follows the image frame; and
the controller is configured to, after skipping the capture of the image frame, skip capture of the subsequent image frame.

11. An image sensor, comprising:
an array of pixels;
a set of one or more programming registers configured to store,
a first value indicating a duration of an integration time for an image frame; and
a second value indicating an exposure truncate decision; and
a controller in read communication with the set of one or more programming registers and configured to,
monitor the second value;
determine, prior to beginning capture of the image frame, that the second value indicates a decision to truncate
determine a period of time before beginning capture of the image frame is less than a threshold period of time; and
operate the array of pixels in accord with a truncated integration time having a duration less than the duration indicated by the first value.

12. The image sensor of claim 11, wherein the controller is configured to initiate a readout of the array of pixels after the truncated integration time.

13. The image sensor of claim 11, wherein the controller is configured to operate the array of pixels to capture the image frame in accord with a rolling shutter.

14. The image sensor of claim 13, wherein the controller is configured to truncate the capture of the image frame by truncating an integration time of each line of pixels in the array of pixels after a same truncated integration time.

15. The image sensor of claim 11, wherein:
the image frame is grouped with a subsequent image frame that follows the image frame; and
the controller is configured to, after truncating the capture of the image frame, capture the subsequent image frame using a same truncated integration time used to capture the image frame.

16. The image sensor of claim 11, wherein:
the set of one or more programming registers is configured to store a third value indicating a truncated duration of a truncated integration time; and
the controller is configured to,
operate the array of pixels in accord with the third value, after determining that the second value indicates the decision to truncate, to capture the image frame.

17. The image sensor of claim 11, wherein the decision to truncate is received at the set of one or more programming registers, from an image sensor host, in response to at least one of:

movement of the image sensor exceeding a threshold movement;

removal of the image sensor from a tripod; or detection of a predetermined change in an ambient lighting condition.

18. The image sensor of claim 11, wherein the controller is configured to reset the second value after capture of the image frame.

* * * * *